US011278848B2

United States Patent
Yajima et al.

(10) Patent No.: US 11,278,848 B2
(45) Date of Patent: Mar. 22, 2022

(54) HONEYCOMB SHAPED POROUS CERAMIC BODY, MANUFACTURING METHOD FOR SAME, AND HONEYCOMB SHAPED CERAMIC SEPARATION MEMBRANE STRUCTURE

(71) Applicant: NGK Insulators, Ltd., Nagoya (JP)

(72) Inventors: Kenji Yajima, Nagoya (JP); Makoto Miyahara, Nagoya (JP); Tetsuya Uchikawa, Nagoya (JP); Makoto Teranishi, Nagoya (JP); Makiko Ichikawa, Nagoya (JP); Hideyuki Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1095 days.

(21) Appl. No.: 14/493,799

(22) Filed: Sep. 23, 2014

(65) Prior Publication Data

US 2015/0008177 A1 Jan. 8, 2015

Related U.S. Application Data

(63) Continuation of application No. PCT/JP2013/059764, filed on Mar. 29, 2013.

(30) Foreign Application Priority Data

Mar. 30, 2012 (JP) .............................. JP2012-080219

(51) Int. Cl.
*B01D 71/02* (2006.01)
*B01D 63/06* (2006.01)
(Continued)

(52) U.S. Cl.
CPC .......... *B01D 71/02* (2013.01); *B01D 63/066* (2013.01); *B01D 69/10* (2013.01); *B01D 71/024* (2013.01);
(Continued)

(58) Field of Classification Search
None
See application file for complete search history.

(56) References Cited

U.S. PATENT DOCUMENTS 4,889,630 A * 12/1989 Reinhardt .............. B01D 39/14
210/490
6,077,800 A 6/2000 Takahashi et al.
(Continued)

FOREIGN PATENT DOCUMENTS

JP 10-236887 A1 9/1998
JP 2000-288324 A1 10/2000
(Continued)

OTHER PUBLICATIONS

U.S. Appl. No. 14/492,600, filed Sep. 22, 2014, Uchikawa et al.
(Continued)

*Primary Examiner* — Jason M Greene
*Assistant Examiner* — Eric J McCullough
(74) *Attorney, Agent, or Firm* — Burr & Brown, PLLC

(57) ABSTRACT

A separation membrane structure has partition walls including a honeycomb shaped porous ceramic body provided with a large number of pores, and cells to become through channels of a fluid are formed by the partition walls. The cells include separation cells and slit cells. In the separation cells, the intermediate layer is disposed on the surface of a substrate, and a separation layer is further formed. The intermediate layer has a structure where aggregate particles are bonded to one another by an inorganic bonding material having a thermal expansion coefficient equal to or higher than that of the aggregate particles.

5 Claims, 6 Drawing Sheets

(51) Int. Cl.
 *C04B 38/00* (2006.01)
 *B01D 69/10* (2006.01)
 *C04B 111/00* (2006.01)

(52) U.S. Cl.
 CPC ...... *C04B 38/0006* (2013.01); *C04B 38/0019* (2013.01); *C04B 2111/00793* (2013.01)

(56) References Cited

U.S. PATENT DOCUMENTS

| | | | | |
|---|---|---|---|---|
| 6,264,811 | B1 * | 7/2001 | Wang | B01D 53/228 |
| | | | | 204/295 |
| 6,479,099 | B1 | 11/2002 | Takahashi et al. | |
| 6,509,060 | B1 | 1/2003 | Komoda et al. | |
| 2009/0110873 | A1 * | 4/2009 | Jiang | B01D 71/60 |
| | | | | 428/116 |
| 2010/0242426 | A1 * | 9/2010 | Ohara | B01D 46/2429 |
| | | | | 55/523 |
| 2010/0243557 | A1 | 9/2010 | Tomita et al. | |
| 2012/0074061 | A1 * | 3/2012 | Teranishi | B01D 61/362 |
| | | | | 210/640 |
| 2013/0126420 | A1 | 5/2013 | Teranishi et al. | |
| 2014/0014574 | A1 | 1/2014 | Teranishi et al. | |
| 2014/0021129 | A1 | 1/2014 | Teranishi et al. | |

FOREIGN PATENT DOCUMENTS

| | | | | |
|---|---|---|---|---|
| JP | 2001-259324 | A1 | 9/2001 | |
| JP | 2001-300273 | A1 | 10/2001 | |
| JP | 2003-176185 | A1 | 6/2003 | |
| JP | 2003-230808 | A1 | 8/2003 | |
| JP | 2005-066549 | A1 | 3/2005 | |
| JP | 2006-263566 | A1 | 10/2006 | |
| JP | 2009-101310 | A1 | 5/2009 | |
| JP | 2010-228948 | A1 | 10/2010 | |
| JP | WO 2010134514 | A1 * | 11/2010 | ........... B01D 61/362 |
| WO | 2010/134514 | A1 | 11/2010 | |
| WO | 2012/008476 | A1 | 1/2012 | |
| WO | 2012/128217 | A1 | 9/2012 | |
| WO | 2012/128218 | A1 | 9/2012 | |

OTHER PUBLICATIONS

International Search Report and Written Opinion (Application No. PCT/JP2013/059764) dated Jun. 11, 2013.
Japanese Office Action (Application No. 2014-508239) dated Jul. 5, 2016 (with English translation).
Extended European Search Report (Application No. 13768549.1) dated Oct. 19, 2015.

* cited by examiner

| SEPARATION LAYER 33 |
| --- |
| TOP LAYER 32 |
| INTERMEDIATE LAYER 31<br>PREDETERMINED INORGANIC BONDING MATERIAL |
| SUBSTRATE 30 |

FIG.3B

| SEPARATION LAYER 33 |
| INTERMEDIATE LAYER 31<br>PREDETERMINED INORGANIC BONDING MATERIAL |
| SUBSTRATE 30 |

FIG.3C

| SEPARATION LAYER 33 |
| TOP LAYER 32 |
| SECOND INTERMEDIATE LAYER 31b |
| FIRST INTERMEDIATE LAYER 31a<br>PREDETERMINED INORGANIC BONDING MATERIAL |
| SUBSTRATE 30 |

FIG.3D

| SEPARATION LAYER 33 |
| TOP LAYER 32 |
| SECOND INTERMEDIATE LAYER 31b<br>PREDETERMINED INORGANIC BONDING MATERIAL |
| FIRST INTERMEDIATE LAYER 31a |
| SUBSTRATE 30 |

HONEYCOMB SHAPED POROUS CERAMIC BODY, MANUFACTURING METHOD FOR SAME, AND HONEYCOMB SHAPED CERAMIC SEPARATION MEMBRANE STRUCTURE

BACKGROUND OF THE INVENTION

1. Field of the Invention

The present invention relates to a honeycomb shaped porous ceramic body in which generation of cracks is inhibited, a manufacturing method for the same, and a honeycomb shaped ceramic separation membrane structure including a separation layer.

2. Description of Related Art

In recent years, ceramic filters have been used to selectively collect only a specific component from a mixture (a mixed fluid) of multiple components. The ceramic filter is more excellent in mechanical strength, durability, corrosion resistance and the like as compared with an organic polymer filter, and hence the ceramic filter is preferably applied to removal of a suspended substance, bacteria, dust and the like from a liquid or a gas, in a wide range of fields of water treatment, exhaust gas treatment, pharmaceutical, food, or the like.

In such a ceramic filter, for the purpose of improving a permeation performance while maintaining a separation performance, it is necessary to enlarge a membrane area (the area of a separation membrane), and for that, the membrane preferably possesses a honeycomb shape. Furthermore, the filter of the honeycomb shape (a honeycomb shaped ceramic separation membrane structure) has advantages such as resistivity to breakage and achievement of cost reduction as compared with a tube type. In many cases, the honeycomb shaped ceramic separation membrane structure includes a porous substrate whose outer shape is columnar and which has therein a large number of parallel through channels (referred to as cells) formed in an axial direction thereof. Furthermore, the separation membrane (a separation layer) having smaller pore diameters than the porous substrate is formed on an inner wall surface provided with the cells.

In the honeycomb shaped ceramic separation membrane structure (a precision filtration membrane, an ultrafiltration membrane, a pervaporation membrane, a gas separation membrane, or a reverse osmosis membrane), a permeation flow rate is preferably increased by applying a high pressure during operation. Particularly, in the ultrafiltration membrane, the gas separation membrane and the reverse osmosis membrane, a permeation coefficient of the separation membrane is small, and hence it is necessary to perform separation and purification under a high operation pressure.

In Patent Document 1, a ceramic porous membrane having a bonding portion made of titania is disclosed. There is provided a porous body which can be prepared by performing firing at a low temperature and which has a practicable strength and a corrosion resistance.

In Patent Document 2, a porous ceramic body including frit (titania or the like) and fine particle aggregates is disclosed. A raw material including aggregates and frit is sintered, thereby providing a porous ceramic body having a higher strength than before.

In Patent Document 3, a porous alumina body which is excellent in acid resistance and alkali resistance is disclosed. The porous alumina body includes 5 to 30 mass % of titania and 1.5 mass % or less of an oxide of at least one element selected from the group consisting of copper, manganese, calcium and strontium. There is provided a porous alumina body which includes one of four elements including titania and copper, and hence has a high strength and is excellent in corrosion resistance against an alkali solution or an acid solution.

CITATION LIST

Patent Documents

[Patent Document 1] JP-A-H10-236887
[Patent Document 2] JP-A-2003-176185
[Patent Document 3] JP-A-2010-228948

SUMMARY OF THE INVENTION

Problem to be Solved by the Invention

In a honeycomb shaped ceramic separation membrane structure, a porous intermediate layer having a smaller average pore diameter as compared with the surface of a substrate is preferably disposed on a substrate, and a separation membrane is preferably disposed on the intermediate layer. Furthermore, when the honeycomb shaped ceramic separation membrane structure has slit cells which are not provided with the separation membrane in addition to separation cells provided with the separation membrane (a separation layer), a fluid allowed to permeate the separation membrane passes through the slit cells and is discharged to the outside, and hence a pressure loss can be decreased, which is advantageous for membrane separation.

However, when the honeycomb shaped ceramic separation membrane structure has two types of cells, i.e., the separation cells and the slit cells, there has been a problem that a crack (a slit crack) is easily generated in a portion adjacent to each of the slit cells. When the slit cracks are generated, deterioration of strength easily occurs. In particular, there is a possibility that the cracks extend due to long-term use, thereby deteriorating the strength. Furthermore, when the slit crack is generated between the slit cell and the separation cell, a defect is generated in the separation layer due to the cracks, which causes a problem that a separation performance cannot sufficiently be exerted.

In Patent Documents 1 and 2, there is not any description concerning the slit cells, and when the porous body has the slit cells, it is not clear in which range any slit cracks are not generated and a porous body having a high internal pressure breaking strength can be prepared. Also in Patent Document 3, there is not any description concerning the slit cells, and it is necessary to surely include one of four elements including copper.

An object of the present invention is to provide a honeycomb shaped porous ceramic body in which slit cracks are not easily generated, when the porous ceramic body has separation cells which have a separation layer above a disposed intermediate layer and slit cells in which the intermediate layer is not disposed, a manufacturing method for the porous ceramic body, and a honeycomb shaped ceramic separation membrane structure.

Means for Solving the Problem

The present inventors have found that slit cracks are easily generated when a thermal expansion coefficient of a bonding material of fine particles included in an intermediate layer is smaller than that of aggregates of the intermediate layer. When the thermal expansion coefficient of the bonding material is small a portion around each separation cell having the intermediate layer does not easily shrink though sintered at a high temperature and cooled. On the other hand, the aggregates noticeably shrink in the vicinity of each slit cell that does not have the intermediate layer. Therefore, tensile stress acts between a portion including more separation cells and a portion including more slit cells, and hence the slit cracks are generated. To solve the problem, according to the present invention, there are provided a honeycomb shaped porous ceramic body, a manufacturing method for the same, and a honeycomb shaped ceramic separation membrane structure in the following.

According to a first aspect of the present invention, a honeycomb shaped porous ceramic body is provided including a honeycomb shaped substrate which has partition walls made of a porous ceramic material provided with a large number of pores and in which there are formed a plurality of cells to become through channels of a fluid passing through the porous ceramic body by the partition walls; separation cells wherein an intermediate layer made of a porous ceramic material provided with a large number of pores and having a smaller average pore diameter as compared with the surface of the substrate, and disposed at the surface of the substrate is disposed; and slit cells in which the intermediate layer is not disposed, wherein the intermediate layer has a structure where aggregate particles are bonded to one another by an inorganic bonding material having a thermal expansion coefficient equal to or higher than that of the aggregate particles.

According to a second aspect of the present invention, the honeycomb shaped porous ceramic body according to the above first aspect is provided, wherein aggregates constituting the substrate and the intermediate layer are alumina, and the inorganic bonding material which bonds the aggregates of the intermediate layer is titania.

According to a third aspect of the present invention, the honeycomb shaped porous ceramic body according to the above first or second aspects is provided, which has an internal pressure breaking strength of 8 MPa or more.

According to a fourth aspect of the present invention, the honeycomb shaped porous ceramic body according to any one of the above first to third aspects is provided, wherein a content ratio of a component of the inorganic bonding material in an inorganic solid content of the intermediate layer is from 5 to 15 mass %.

According to a fifth aspect of the present invention, the honeycomb shaped porous ceramic body according to any one of the above first to fourth aspects is provided, wherein on the intermediate layer, a top layer made of a porous ceramic material having finer particles than the intermediate layer is disposed.

According to a sixth aspect of the present invention, the honeycomb shaped porous ceramic body according to the above fifth aspect is provided, wherein the top layer includes alumina as a main component.

According to a seventh aspect of the present invention, a honeycomb shaped ceramic separation membrane structure in which a separation layer is further disposed in the separation cells of the honeycomb shaped porous ceramic body according to any one of the above first to sixth aspects is provided.

According to an eighth aspect of the present invention, a manufacturing method for the honeycomb shaped porous ceramic body according to any one of the above first to sixth aspects is provided, in which a slurry for the intermediate layer including the aggregates and the inorganic bonding material to become the intermediate layer is adhered to the substrate, and fired at 1150 to 1300° C., to form the intermediate layer.

Effect of the Invention

In a honeycomb shaped porous ceramic body of the present invention, cracks are hardly generated in portions adjacent to the slit cells (portions between the slit cells or portions between the slit cells and the separation cells), and the porous ceramic body has a high strength. Therefore, the separation layer (separation membrane) having a high separation performance can be prepared.

BRIEF DESCRIPTION OF THE DRAWINGS

FIG. 3B is a schematic view showing a layer constitution of Embodiment 2 of the separation membrane structure;

FIG. 3C is a schematic view showing a layer constitution of Embodiment 3 of the separation membrane structure;

FIG. 3D is a schematic view showing a layer constitution of Embodiment 4 of the separation membrane structure;

DETAILED DESCRIPTION OF THE INVENTION

Hereinafter, an embodiment of the present invention will be described with reference to the drawings. The present invention is not limited to the following embodiment, and changes, modifications and improvements can be added without departing from the gist of the invention.

1. Honeycomb Shaped Separation Membrane Structure

Figure 1:
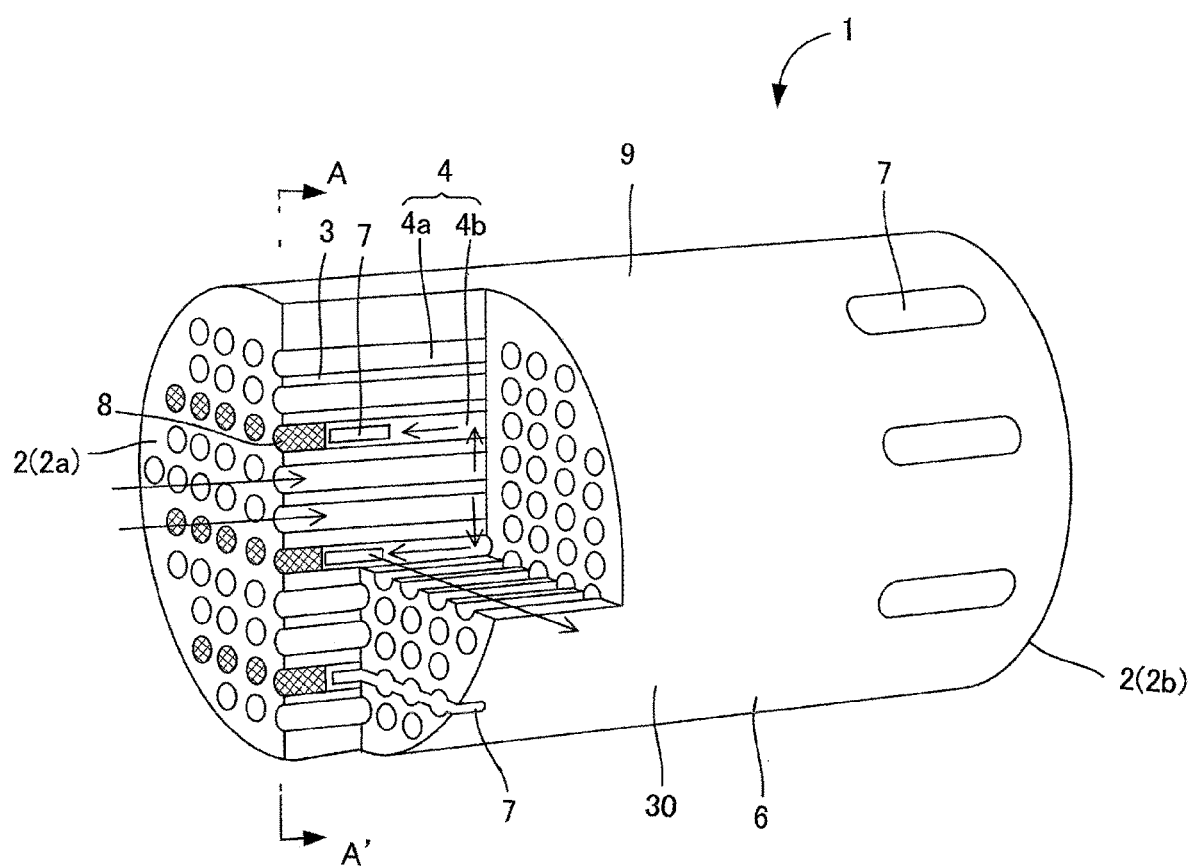
FIG. 1 is a perspective view showing a cut-out part of one embodiment of a honeycomb shaped ceramic separation membrane structure including a honeycomb shaped porous ceramic body according to the present invention.
Figures 2, 3A:
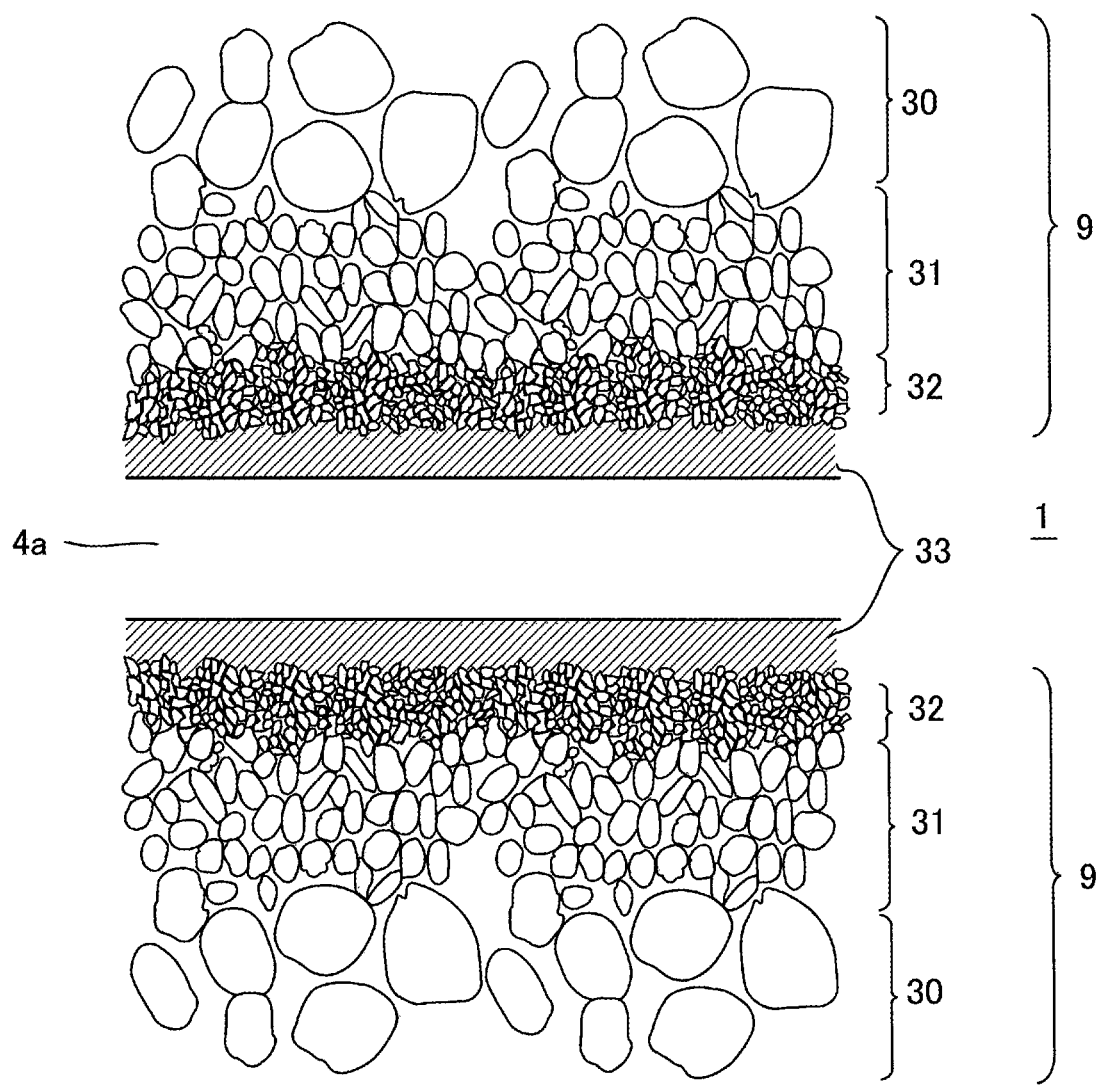
FIG. 2 is a partially enlarged sectional view showing an enlarged vicinity of a separation cell of a cross section cut along the line A-A' of FIG. 1.
FIG. 3A is a schematic view showing a layer constitution of Embodiment 1 of the separation membrane structure.

FIG. 1 shows one embodiment of a honeycomb shaped ceramic separation membrane structure 1 including a honeycomb shaped porous ceramic body 9 according to the present invention. Furthermore, FIG. 2 shows a partially enlarged sectional view showing an enlarged vicinity of a separation cell of a cross section cut along the line A-A' of FIG. 1. The honeycomb shaped ceramic separation membrane structure 1 (hereinafter also referred to simply as the separation membrane structure) includes a substrate 30 of a honeycomb shape, an intermediate layer 31, and a separation layer 33 (in the present description, the substrate 30 and the intermediate layer 31 are referred to as the honeycomb shaped porous ceramic body 9). It is to be noted that the separation membrane structure 1 has cells 4 in which the intermediate layer 31 is disposed and cells 4 in which the intermediate layer 31 is not disposed, as describer later.

The separation membrane structure 1 has partition walls 3 including the honeycomb shaped porous ceramic body 9 (hereinafter also referred to simply as the porous body 9) provided with a large number of pores, and cells 4 that become through channels of a fluid are formed by the partition walls 3. The cells 4 include separation cells 4a and slit cells 4b. In the separation cells 4a, the intermediate layer 31 is disposed at the surface of the substrate 30, and the separation layer 33 is further formed. The intermediate layer 31 is made of a porous ceramic material provided with a large number of pores and having a smaller average pore diameter as compared with the surface of the substrate 30. On the other hand, in the slit cells 4b, the intermediate layer 31 is not disposed, and the separation layer 33 is not formed.

The intermediate layer 31 has a structure in which aggregate particles are bonded to one another by an inorganic bonding material having a thermal expansion coefficient equal to or higher than that of the aggregate particles. As aggregates constituting the substrate 30 and the intermediate layer 31, for example, alumina may be used. In this case, as the inorganic bonding material which bonds the aggregates of the intermediate layer 31, for example, titania may be used.

In the separation membrane structure 1 of the present invention, on the intermediate layer 31 of the porous body 9, a top layer 32 made of a porous ceramic material having finer particles than the intermediate layer 31 is preferably disposed. The separation membrane structure has the top layer 32, and hence the separation layer 33 can be formed with fewer defects. The top layer 32 preferably includes alumina as a main component. Here, the main component means that the top layer 32 includes 50 mass % or more of alumina. It is to be noted that a ratio of the component is a mass ratio of an oxide obtained by converting an element ratio measured by EDS (energy dispersive spectroscopy X-ray analysis). Alumina is included as the main component, which can improve strength.

In the present invention, a layer to be disposed on the surface of the substrate 30 is the intermediate layer 31. Furthermore, a layer having the separation layer 33 disposed on the surface thereof is the top layer 32. However, when one layer is only interposed between the substrate 30 and the separation layer 33, the top layer 32 is not disposed, and the separation layer 33 is disposed directly on the intermediate layer 31. Furthermore, it is considered that when a plurality of layers are interposed between the substrate 30 and the top layer 32, all the layers are the intermediate layers 31. When the plurality of intermediate layers 31 are present, the inorganic bonding material having the same thermal expansion coefficient as in the aggregate particles or a higher thermal expansion coefficient than the aggregate particles is used in one of the intermediate layers 31.

FIG. 3A to FIG. 3D show layer constitutions of the separation membrane structure 1. FIG. 3A shows an embodiment having an intermediate layer 31 and a top layer 32 on a substrate 30 (the same embodiment as in FIG. 2). FIG. 3B shows an embodiment in which an intermediate layer 31 is only formed on a substrate 30 and a top layer 32 is not formed. FIG. 3C and FIG. 3D show embodiments in which a first intermediate layer 31a, a second intermediate layer 31b and a top layer 32 are formed on a substrate 30. In the first intermediate layer 31a of FIG. 3C and the second intermediate layer 31b of FIG. 3D, there is used a predetermined inorganic bonding material (having thermal expansion coefficient equal to or higher than that of the aggregate particles). It is to be noted that in both of the first intermediate layer 31a and the second intermediate layer 31b, the inorganic bonding material having thermal expansion coefficient equal to or higher than that of the aggregate particles may be used. Furthermore, the intermediate layer 31 may include three layers or more.

The separation membrane structure 1 includes the separation layer 33 which separates a mixture, directly or indirectly (when the separation membrane structure has the top layer 32) on the intermediate layer 31 of the separation cell 4a. An example of the separation layer 33 is a zeolite membrane. Furthermore, an example of the zeolite membrane is a DDR type zeolite membrane.

In the embodiment shown in FIG. 1, for the porous body 9 including the substrate 30 and the intermediate layer 31, its outer shape is columnar, and the porous body has an outer peripheral surface 6. Furthermore, the porous body includes a plurality of separation cells 4a formed in a row to extend through the porous body from one end face 2a to the other end face 2b, and a plurality of slit cells 4b formed in a row from the one end face 2a to the other end face 2b. In the separation membrane structure 1, a sectional shape of the separation cells 4a and the slit cells 4b is circular. Furthermore, open ends of both the end faces 2a, 2b of the separation cells 4a are open (remain open). However, for the slit cells 4b, open ends of both the end faces 2a, 2b are plugged with a plugging material to form plugging portions 8, and discharge through channels 7 are disposed so that the slit cells 4b communicate with an external space. Furthermore, the separation layer 33 is disposed at the surface of the intermediate layer 31 of an inner wall surface provided with the separation cells 4a whose sectional shapes are circular. Furthermore, a glass seal 35 is preferably disposed to cover at least the end faces 2a, 2b of the substrate 30. The separation membrane structure 1 is a ceramic filter which separates a mixture. Hereinafter, description will be made in more detail.

(Substrate)

A material of the substrate 30 is ceramic. Preferably, a material of the aggregate particles is alumina ($Al_2O_3$), titania ($TiO_2$), mullite ($Al_2O_2 \cdot SiO_2$), potsherd, cordierite ($Mg_2Al_4Si_5O_{18}$) or the like. In these materials, alumina is further preferable because a raw material (aggregate particles) in which particle diameters are controlled is easily obtained, a stable kneaded material can be formed, and a corrosion resistance is high. The inorganic bonding material is preferably one selected from the group consisting of sinterable alumina, silica, glass frit, clay mineral, and sinterable cordierite. The inorganic bonding material is a bonding material to bond the aggregate particles, and is an inorganic component which sinters and solidifies at a temperature at which a component of the aggregates does not sinter. When alumina is selected as the component of the aggregates, sinterable alumina has an average particle diameter of $\frac{1}{10}$ or less of that of the aggregates. When cordierite is selected as the component of the aggregates, sinterable cordierite has an average particle diameter of $\frac{1}{10}$ or less of that of the aggregates. It is to be noted that the average particle diameter is a value measured by "a laser diffraction method" regardless of the substrate 30, the intermediate layer 31 or the like. Furthermore, examples of the clay mineral include kaolin, dolomite, montmorillonite, feldspar, calcite, talc, and mica.

In the substrate 30, an average pore diameter is preferably from 5 to 25 μm. The average pore diameter is more preferably from 5 to 20 μm and further preferably from 6 to 20 μm. When the average pore diameter of the substrate 30 is 5 μm or more, a permeation speed of a permeated separation component separated by the separation layer 33 in the substrate 30 is fast, and a permeation flow rate per unit time can sufficiently be maintained. On the other hand, when the average pore diameter is 25 μm or less, a membrane on the substrate is easily uniformly formed.

Furthermore, a porosity of the substrate 30 is preferably from 25 to 50%. The average pore diameter and the porosity are values measured by a mercury porosimeter.

There is not any special restriction on the whole shape or size of the substrate 30, as long as the separating function is not disturbed. Examples of the whole shape include a columnar (cylindrical) shape, an elliptic pillar shape, a quadrangular pillar shape (a tubular shape in which a cross section perpendicular to a central axis is quadrangular), and a triangular pillar shape (a tubular shape in which the cross section perpendicular to the central axis is triangular). Above all, the shape is preferably columnar so that the substrate is easily extruded, has less firing deformation, and is easily sealed to a housing. When the substrate is used in precise filtration or ultrafiltration, the shape is preferably columnar in which a diameter of the cross section perpendicular to the central axis is from 30 to 220 mm, and a length (the total length) in a central axis direction is from 150 to 2000 mm.

Examples of the sectional shape of the cells 4 of the substrate 30 (the shape in the cross section perpendicular to an extending direction of the cells 4) include a circular shape, an elliptic shape, and a polygonal shape, and examples of the polygonal shape include a quadrangular shape, a pentangular shape, a hexagonal shape and a triangular shape. It is to be noted that the extending direction of the cells 4 is the same as the central axis direction, when the substrate 30 is columnar (cylindrical).

When the sectional shape of the cells 4 of the substrate 30 is circular, a diameter of each of the cells 4 (a cell diameter 42: see FIG. 4) is preferably from 1 to 5 mm. When the diameter is 1 mm or more, the membrane area can sufficiently be maintained. When the diameter is 5 mm or less, a strength of the ceramic filter can sufficiently be maintained.

Figure 4:
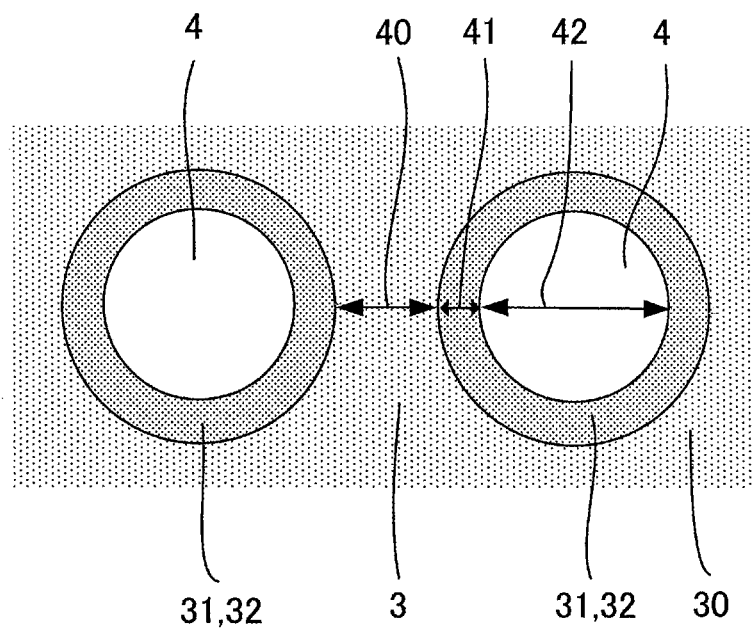
FIG. 4 is a schematic view showing an end face of a honeycomb shaped porous ceramic body.

In the substrate 30, a substrate thickness 40 of the shortest portion between the cells 4 that does not include the intermediate layer 31 and the separation layer 33 is preferably 0.51 mm or more and 1.55 mm or less. As shown in FIG. 4, the substrate thickness 40 is a thickness of the substrate 30 which is extruded, and a thickness of a portion which does not include the intermediate layer 31 and the separation layer 33. The substrate thickness 40 is more preferably 0.51 mm or more and 1.2 mm or less and further preferably 0.65 mm or more and 1.0 mm or less. When the substrate thickness 40 is 0.51 mm or more, an internal pressure breaking strength can sufficiently be maintained. However, when the substrate thickness 40 is excessively large, the number of the cells which can be disposed in a predetermined volume decreases, and hence a membrane area decreases. In consequence, the permeation flow rate lowers, and hence the substrate thickness is preferably 1.55 mm or less. It is to be noted that when the cells 4 are circular, the substrate thickness 40 is a distance shown in FIG. 4, but when the cells have another shape, the substrate thickness is the shortest distance between the cells 4.

(Intermediate Layer)

The porous body 9 of the present invention is a honeycomb shaped porous ceramic body including the honeycomb shaped substrate 30 and the intermediate layer 31. The intermediate layer 31 is disposed in the separation cells 4*a*. A material of the aggregate particles of the intermediate layer 31 is preferably one selected from the group consisting of alumina, titania, mullite, potsherd and cordierite. Furthermore, the inorganic bonding material of the intermediate layer 31 has the same thermal expansion coefficient as in the aggregate particles or a higher thermal expansion coefficient than the aggregate particles. When the material of the aggregate particles is alumina (the thermal expansion coefficient: $7.7 \times 10^{-6}$/K), examples of the inorganic bonding material include alumina, titania (the thermal expansion coefficient: $7.82 \times 10^{-6}$/K), partially stabilized zirconia (the thermal expansion coefficient: $10.5 \times 10^{-6}$/K), and glass (the thermal expansion coefficient: $7.7 \times 10^{-6}$/K or more). The inorganic bonding material is an inorganic component which sinters and solidifies at a temperature at which the component of the aggregates does not sinter. When the same component as in the aggregate particles is used as the inorganic bonding material, a particle diameter of the inorganic bonding material is preferably 1/10 or less of the particle diameter of the aggregate particles. It is to be noted that the average particle diameter is a value measured by "a laser diffraction method" regardless of the substrate 30, the intermediate layer 31 or the like. Furthermore, examples of the clay mineral include kaolin, dolomite, montmorillonite, feldspar, calcite, talc, and mica.

A content ratio of the component of the inorganic bonding material in an inorganic solid content of the intermediate layer 31 is preferably from 5 to 15 mass %. The content ratio is more preferably from 8 to 15 mass % and further preferably from 10 to 15 mass %. When the content ratio is in this range, the strength can be improved. The content ratio of 5 mass % or more is sufficient for an amount of the bonding material. When the content ratio is 15 mass % or less, there is not any useless inorganic bonding material that does not contribute as the bonding material, and manufacturing cost can be suppressed. It is to be noted that the content ratio (mass %) of the component of the inorganic bonding material in the inorganic solid content=(the inorganic bonding material)/(the aggregate particles+the inorganic bonding material)×100. It is to be noted that the content ratio is a value calculated from a mass ratio in a raw material forming the intermediate layer 31.

When the intermediate layer 31 is constituted of a plurality of layers or when the intermediate layer 31 and the top layer 32 are disposed, the respective intermediate layers 31 (and the top layer 32) are preferably disposed so that the average pore diameter successively decreases from the side of the substrate 30 toward the side of the separation layer 33. Specifically, the porous body is preferably constituted of the intermediate layer 31 having an average pore diameter of the order of 1 to 10 μm and the top layer 32 having an average pore diameter of the order of 0.1 μm. The average pore diameter of the intermediate layer 31 is a value measured by an air flow method described in ASTM F316.

When the plurality of intermediate layers 31 are formed on the substrate 30 in addition to the separation layer 33 (the separation membrane), the aggregate particles are bonded by the inorganic bonding material having the thermal expansion coefficient equal to or higher than that of the aggregate particles in at least one of the layers.

(Top Layer)

On the intermediate layer 31, the top layer 32 made of a porous ceramic material having finer particles than the intermediate layer 31 is preferably disposed, and on the top layer, the separation layer 33 is preferably disposed. A main component of the top layer 32 is preferably alumina, titania, cordierite or the like, and in these components, alumina is especially preferable.

A thickness of the intermediate layer 31 and the top layer 32 (an intermediate layer and top layer thickness 41) is preferably 150 μm or more and 500 μm or less. The intermediate layer and top layer thickness 41 is a total thickness of all the layers, when the intermediate layer 31 is constituted of the plurality of layers. The thickness is more preferably 160 μm or more and 400 μm or less and further preferably 200 μm or more and 300 μm or less.

When the intermediate layer and top layer thickness 41 is excessively large, the cell diameter 42 is accordingly small. Therefore, a membrane area of the separation layer 33 of the outermost layer decreases, and hence a membrane treatment ability deteriorates. When the intermediate layer and top layer thickness 41 is excessively small, the original strength of the porous body 9 before the hydrothermal synthesis deteriorates.

A ratio of the substrate thickness/the intermediate layer and top layer thickness is preferably 2.5 or more. The ratio is more preferably 2.5 or more and 10.3 or less and further preferably 2.5 or more and 4.3 or less. When the ratio of the substrate thickness/the intermediate layer and top layer thickness is 2.5 or more, the deterioration of the strength due to the formation of the separation layer 33 of the zeolite membrane or the like can be lessened. When the ratio is 4.0 or more, the strength can be prevented from being deteriorated due to the formation of the separation layer 33 of the zeolite membrane or the like. When the ratio of the substrate thickness/the intermediate layer and top layer thickness is large, the deterioration of the strength is preferably prevented. However, the area of the zeolite membrane (the membrane area) becomes smaller and an amount of a treatable fluid decreases. Therefore, the ratio is more preferably 10.3 or less and further preferably 4.3 or less.

(Separation Layer)

The separation layer 33 (the separation membrane) is provided with a plurality of pores, has a smaller average pore diameter as compared with the porous body 9 (the substrate 30 and the intermediate layer 31), and is disposed at the inner wall surface of each of the cells 4 (the surface of each of the partition walls 3). The separation layer 33 can separate a mixture. In the ceramic filter of a structure including the separation layer 33 in this manner, a separating function is exerted exclusively by the separation layer 33, and hence the average pore diameter of the porous body 9 can be increased. Therefore, it is possible to decrease a flow resistance when the fluid allowed to permeate the separation layer 33 and move from the cells 4 into the porous body 9 permeates the porous body 9, and it is possible to improve a fluid permeability.

The average pore diameter of the separation layer 33 can suitably be determined in accordance with a required filtering performance or separation performance (particle diameters of a substance to be removed). For example, in the case of the ceramic filter for use in the precise filtration or the ultrafiltration, the average pore diameter is preferably from 0.01 to 1.0 μm. In this case, the average pore diameter of the separation layer 33 is a value measured by the air flow method described in ASTM F316.

As the separation layer 33, a gas separation membrane and a reverse osmosis membrane can be employed. There is not any special restriction on the gas separation membrane, and a known carbon dioxide separation membrane, a helium separation membrane, a hydrogen separation membrane, a carbon membrane, a zeolite membrane, a silica membrane, a titania UF membrane or the like may suitably be selected in accordance with a type of gas to be separated.

When the separation layer 33 is the zeolite membrane, a zeolite of a crystal structure such as LTA, MFI, MOR, FER, FAU, or DDR can be utilized as the zeolite. When the separation layer 33 is made of the DDR type zeolite, the layer can be utilized especially as the gas separation membrane for use in selectively separating carbon dioxide.

(Plugging Portion)

A plugging material preferably includes aggregate particles, an inorganic bonding material, a binder, a thickener and a water holding agent. This plugging material can be formed of the same material as in the porous body 9. A porosity of the plugging portions 8 is preferably from 25 to 50%. When the porosity of the plugging portions 8 is in excess of 50%, a solid content included in a slurry for the intermediate layer which is for use in forming the intermediate layer 31 passes through the plugging portions 8 sometimes. On the other hand, when the porosity of the plugging portions 8 is smaller than 20%, it becomes difficult to discharge a water content included in the slurry for the intermediate layer which is for use in forming the intermediate layer 31 sometimes.

(Glass Seal)

In the separation membrane structure 1 according to the present invention, to prevent a mixed fluid including the permeated separation component from directly flowing into a porous body portion of the end face 2 of the separation membrane structure 1 and flowing outside without being separated by the separation layer 33 formed at the inner wall surface of the predetermined separation cell 4a, a glass seal 35 is preferably further disposed to cover the porous body 9 on the side of the end face 2 into which the mixed fluid of the separation membrane structure 1 flows.

(Separation Membrane Structure)

An internal pressure breaking strength at which the ceramic separation membrane structure 1 is broken when a pressure is applied to the insides of the separation cells 4a is 8 MPa or more. The internal pressure breaking strength is a pressure applied to the insides of the separation cells 4a which breaks the ceramic separation membrane structure 1. In the ceramic separation membrane structure 1 of the present invention, the inorganic bonding material having the thermal expansion coefficient equal to or higher than that of the aggregate particles is used as the inorganic bonding material which bonds the aggregate particles of the intermediate layer 31 to one another, and hence the separation membrane structure 1 has a high internal pressure breaking strength.

2. Separating Method

Figure 5A:
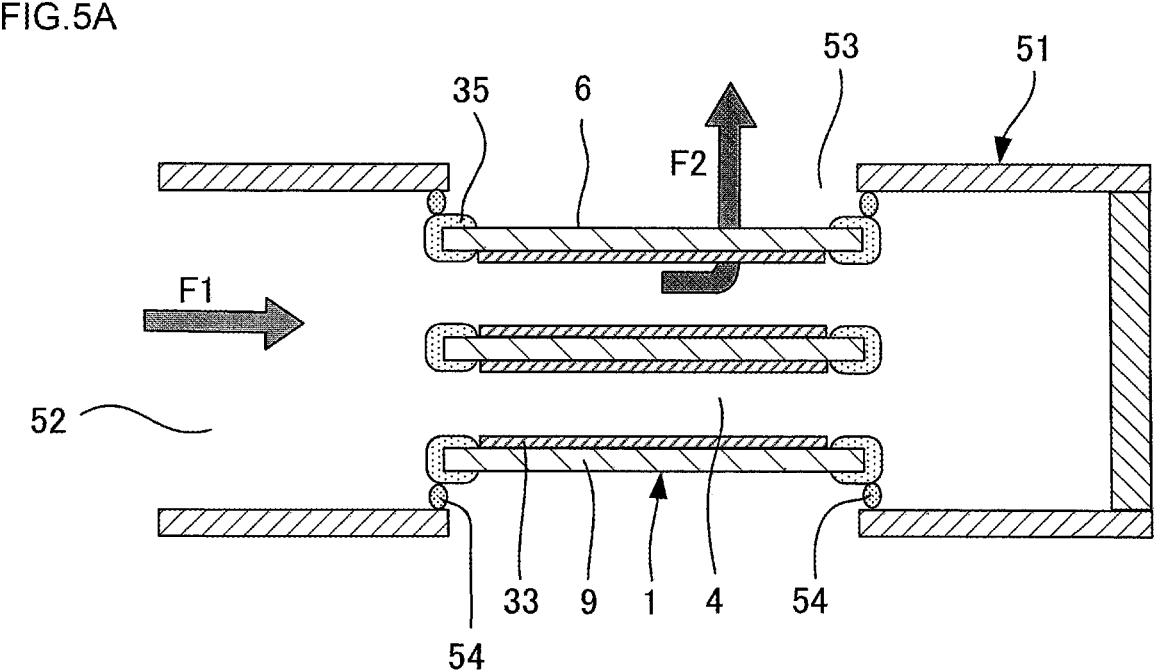
FIG. 5A is a schematic view showing an embodiment in which the honeycomb shaped ceramic separation membrane structure is attached to a housing, and showing a cross section parallel to a cell extending direction of the honeycomb shaped ceramic separation membrane structure.

Next, there will be described a method of separating part of components from a fluid in which a plurality of types of fluids are mixed by using the separation membrane structure 1 of the present embodiment. As shown in FIG. 5A, when the fluid is separated by using the honeycomb shaped separation membrane structure 1 of the present embodiment, the separation membrane structure 1 is placed in a tubular housing 51 having a fluid inlet 52 and a fluid outlet 53, and a fluid F1 to be treated which is allowed to flow into the fluid inlet 52 of the housing 51 is preferably separated by the separation membrane structure 1. Then, the separated fluid to be treated (a treated fluid F2) is preferably discharged from the fluid outlet 53.

When the separation membrane structure 1 is placed in the housing 51, as shown in FIG. 5A, gaps between the separation membrane structure 1 and the housing 51 are preferably closed with sealing materials 54, 54 in both end portions of the separation membrane structure 1.

All of the fluid F1 to be treated which is allowed to flow from the fluid inlet 52 into the housing 51 flows into the cells 4 of the separation membrane structure 1, and the fluid F1 to be treated which is allowed to flow into the cells 4 permeates the separation layer 33 to penetrate the substrate 30 as the treated fluid F2. Then, the fluid flows outside from the substrate 30 through the outer peripheral surface 6 of the substrate 30 and is discharged from the fluid outlet 53 to the outside (the external space). The fluid F1 to be treated and the treated fluid F2 can be prevented from being mixed by the sealing materials 54, 54.

There is not any special restriction on a material of the housing 51, but an example of the material is a stainless steel. Furthermore, there is not any special restriction on the sealing material 54, but an example of the sealing material is an O-ring. Furthermore, examples of the sealing material 54 include fluorine rubber, silicone rubber, and ethylene propylene rubber. These materials are also suitable for use at a high temperature for a long time.

Figure 5B:
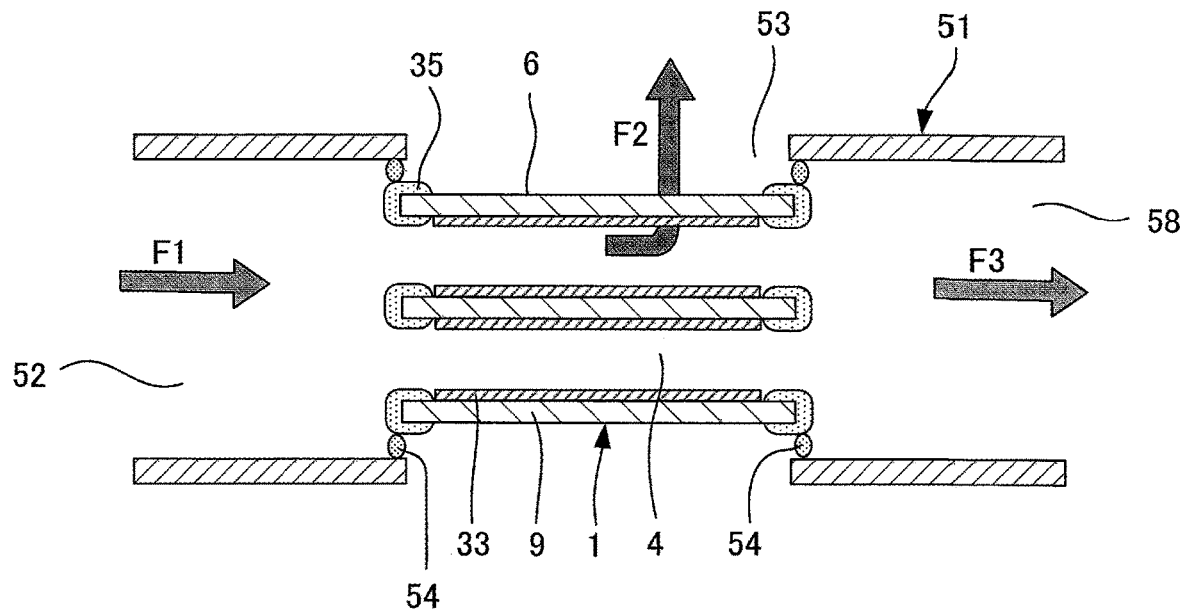
FIG. 5B is a schematic view showing another embodiment in which a honeycomb shaped ceramic separation membrane structure is attached to a housing, and showing a cross section parallel to a cell extending direction of the honeycomb shaped ceramic separation membrane structure.

FIG. 5B shows another embodiment in which a separation membrane structure 1 is attached to a housing 51. As shown in FIG. 5B, the separation membrane structure 1 is placed in the tubular housing 51 having a fluid inlet 52 and fluid outlets 53, 58. In this embodiment, a fluid F1 to be treated which is allowed to flow from the fluid inlet 52 of the housing 51 is separated by the separation membrane structure 1, the separated fluid to be treated (a treated fluid F2) can be discharged from the fluid outlet 53, and a remainder (a fluid F3) can be discharged from the fluid outlet 58. The fluid F3 can be discharged from the fluid outlet 58. Therefore, an operation can be performed at a high flow speed of the fluid F1 to be treated, and a permeation flow speed of the treated fluid F2 can be increased. In general, a deposited layer of a cut component is formed in a membrane surface of a filter, and hence a permeation amount of the treated fluid F2 decreases. Furthermore, by concentration polarization where a concentration of a component which does not permeate the membrane even in gas separation increases, the permeation amount of the treated fluid F2 decreases. However, when the flow speed of the fluid F1 to be treated is high, the cut component flows to the fluid outlet 58. Therefore, the formation of the deposited layer or the concentration polarization is alleviated, and the separation membrane structure is not easily clogged.

3. Manufacturing Method
(Substrate)

Next, a manufacturing method for the separation membrane structure 1 according to the present invention will be described. First, a raw material of the porous body 9 is formed. For example, the raw material is extruded by using a vacuum extrusion machine. In consequence, the honeycomb shaped unfired substrate 30 having the separation cells 4a and the slit cells 4b is obtained. In addition, press molding, cast molding and the like are present and are suitably selectable.

Then, in the obtained unfired substrate 30, the discharge through channels 7 are formed each of which passes from one region of the outer peripheral surface 6 through the slit cells 4b to communicate with another region.

Next, the plugging material of a slurry state is charged into a space reaching the discharge through channels 7 from both the end faces 2a, 2b of the slit cells 4b of the unfired substrate 30 with the obtained discharge through channels 7.

(Intermediate Layer)

Furthermore, the plurality of intermediate layers 31 that become a base of the separation layer 33 are formed at the inner wall surfaces of the separation cells 4a of the substrate 30. To form the intermediate layer 31 (to form the membrane), the slurry for the intermediate layer is first prepared. The slurry for the intermediate layer can be prepared by adding 400 parts by mass of water to 100 parts by mass of a ceramic raw material (aggregates) such as alumina, mullite, titania or cordierite having desirable particle diameters (e.g., an average particle diameter of 4 μm). There is not any special restriction on a material of the aggregates, however the material is preferably the same material as in the substrate 30 from the viewpoint of the thermal expansion coefficient.

Furthermore, the inorganic bonding material is added to this intermediate layer slurry to improve a strength of the sintered membrane. As the inorganic bonding material, there is used the inorganic bonding material having the thermal expansion coefficient equal to or higher than that of the aggregate particles. When, for example, alumina is used as the aggregates, for example, titania may be used as the inorganic bonding material. An average particle diameter of titania prior to the firing is preferably from 0.1 to 1 μm and more preferably from 0.2 to 0.8 μm. When the average particle diameter is 0.1 μm or more, the inorganic bonding material sufficiently remains in the intermediate layer 31 during membrane formation, and when the average particle diameter is 1 μm or less, it easily functions as a bonding material. The average particle diameter is a value measured by a laser diffraction method. The slurry for the intermediate layer which includes such aggregates and a titania sol of the inorganic bonding material is adhered to the inner wall surfaces of the separation cells 4a, dried and sintered at, for example, 1150 to 1300° C. for one to 72 hours to form the intermediate layer 31 (by use of a device described in, e.g., JP-A-S61-238315).

For the intermediate layer 31, a plurality of separate layers can be formed by using a plurality of types of slurries in which the average particle diameters are varied. The second intermediate layer 31b is disposed on the first intermediate layer 31a, so that it is possible to decrease an influence of unevenness of the surface of the porous body 9. As a result, even when the separation layer 33 is a thin membrane, defects of the separation membrane structure 1 can be decreased. That is, it is possible to obtain the separation membrane structure 1 provided with the separation layer 33 having high flux, low cost and high separation ability.

On the intermediate layer 31, the top layer 32 is preferably disposed. In this case, a slurry for the top layer is first conditioned. The slurry for the top layer can be prepared by adding 400 parts by mass of water to 100 parts by mass of a ceramic raw material (aggregates) such as alumina, mullite, titania or cordierite having desirable particle diameters (e.g., an average particle diameter of 0.5 μm). There is not any special restriction on a material of the aggregates, however the material has a thermal expansion coefficient which is equal to or is not noticeably different from that the thermal expansion coefficient of the substrate 30 or the intermediate layer 31. This slurry for the top layer is adhered onto the intermediate layer 31, dried and fired at, for example, 950 to 1300° C. for one to 72 hours to form the top layer 32.

(Separation Layer)

Next, the separation layer 33 is formed on the intermediate layer 31 (or on the top layer 32). A case where the zeolite membrane is disposed as the separation layer 33 will be described. A manufacturing method of the zeolite membrane includes a particle adhering step of allowing a slurry in which zeolite particles that become seeds are dispersed to flow down on the surface of the porous body 9 by its own weight to adhere, thereby adhering the zeolite particles to the porous body 9; and a membrane forming step of immersing the porous body 9 to which the zeolite particles are adhered into a sol to carry out hydrothermal synthesis, thereby forming the zeolite membrane on the porous body 9. The flow-down in the particle adhering step is to allow the slurry to freely drop down on the porous body 9 by its own weight, whereby the slurry flows on the surface of the porous body 9. In a flow-down method, for example, the slurry is poured into a hole of the porous body 9 in which the hole is made in a cylindrical shape, thereby allowing a large amount of liquid to flow in parallel with the surface. In this case, the slurry allowed to flow down flows through the surface of the porous body 9 by its own weight. Therefore, less slurry penetrates into the porous body 9. On the other hand, a heretofore known dripping method is, for example, a method of dripping a small amount of a slurry vertically onto a flat plate, and the dripped slurry penetrates into the flat plate by its own weight. Therefore, a membrane thickness easily increases.

[1] Preparation of Seeding Slurry Liquid/Seeding (Particle Adhering Step)

DDR type zeolite crystal powder is manufactured, and this powder is used as it is, or ground as needed for use as seed crystals. The DDR type zeolite powder (this becomes the seed crystals) is dispersed in a solvent to form a slurry 64 (a seeding slurry liquid). The seeding slurry liquid is preferably diluted with the solvent so that a concentration of a solid content included in this liquid is 1 mass or less. As the solvent for dilution, water, ethanol, or ethanol aqueous solution is preferable. As the solvent for use in dilution, except for water or ethanol, an organic solvent such as acetone or IPA, or an organic solvent aqueous solution is usable. By the use of the organic solvent having a high volatility, a drying time can be shortened, and simultaneously, a penetrating amount of the seeding slurry 64 can be decreased, so that it is possible to form a thinner zeolite membrane. As a method of dispersing the DDR type zeolite powder in the slurry liquid, a general stirring method may be employed and a method of an ultrasonic treatment or the like may be employed.

Figure 6:
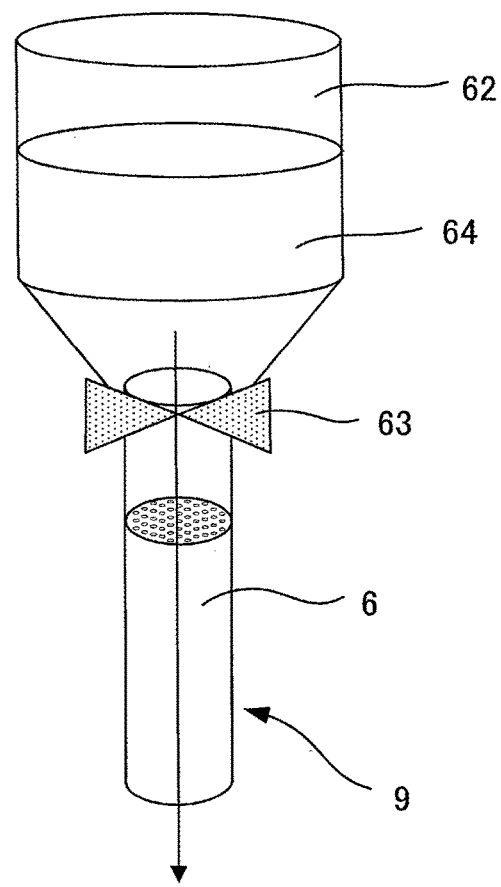
FIG. 6 is a schematic view showing a state where a seeding slurry is poured in a particle adhering step.

FIG. 6 shows one embodiment of the seeding (the particle adhering step) by the flow-down method. The porous body 9 is anchored to a lower end of a wide-mouthed funnel 62, a cock 63 is opened, and the seeding slurry 64 is poured from the upside of the porous body 9 and passed through the cells 4, whereby the particle adhering step can be performed.

A concentration of a solid content in the seeding (particle adhering step) slurry 64 is preferably in a range of 0.00001 to 1 mass %, more preferably in a range of 0.0001 to 0.5 mass %, and further preferably in a range of 0.0005 to 0.2 mass %. When the concentration is smaller than a lower limit value of the concentration range, the number of steps increases to cause cost increase. Furthermore, when the concentration is in excess of 1 mass %, a thick zeolite particle layer is formed on the surface of the porous body 9, and a thick membrane is formed to cause a low flux.

In the slurry 64 of the particle adhering step, water may be used as the solvent in which the zeolite particles are dispersed. Furthermore, an organic solvent or an organic solvent aqueous solution may also be used. Furthermore, ethanol, ethanol aqueous solution or the like may be used.

In the particle adhering step, a step (FIG. 6) of allowing the slurry 64 including the zeolite particles that become the seeds to flow down is preferably performed a plurality of times. The plurality of times is about twice to ten times. When the step is performed the plurality of times, the zeolite particles can evenly be adhered to the whole surface of the porous body 9.

The manufacturing method of the zeolite membrane preferably includes a forced-air drying step after the slurry 64 including the zeolite particles that become the seeds is allowed to flow down. The forced-air drying is to pass forced-air through the surface of the porous body 9 to which the slurry 64 including the zeolite particles is adhered, thereby drying the slurry 64. When the forced-air drying is performed, a drying speed increases, and the zeolite particles can be moved and easily collected on the surface together with the movement of the liquid when the liquid is evaporated.

[2] Preparation of Raw Material Solution (Sol)

Next, there is prepared a raw material solution including 1-adamantaneamine dissolved in ethylenediamine and having a predetermined composition.

1-adamantaneamine is an SDA (a structure directing agent) in synthesis of the DDR type zeolite, i.e., a substance that becomes a mold to form a crystal structure of the DDR type zeolite, and hence a molar ratio to $SiO_2$ (silica) that is a raw material of the DDR type zeolite is important. The 1-adamantaneamine/$SiO_2$ molar ratio needs to be in a range of 0.002 to 0.5, preferably in a range of 0.002 to 0.2, and further preferably in a range of 0.002 to 0.03. When the 1-adamantaneamine/$SiO_2$ molar ratio is smaller than this range, 1-adamantaneamine as SDA is running short, and it is difficult to form the DDR type zeolite. On the other hand, when the ratio is in excess of this range, expensive 1-adamantaneamine is disadvantageously added more than necessary, which is unfavorable from the aspect of manufacturing cost.

1-adamantaneamine is not easily soluble in water that is a solvent of the hydrothermal synthesis, and is therefore dissolved in ethylenediamine and then used for the preparation of the raw material solution. 1-adamantaneamine is completely dissolved in ethylenediamine to prepare the raw material solution of a uniform state, whereby the DDR type zeolite having a uniform crystal size can be formed. An ethylenediamine/1-adamantaneamine molar ratio needs to be in a range of 4 to 35, preferably in a range of 8 to 24, and further preferably in a range of 10 to 20. When the ethylenediamine/1-adamantaneamine molar ratio is smaller than this range, an amount of ethylenediamine to completely dissolve 1-adamantaneamine is not sufficiently obtained, but when the ratio is in excess of this range, ethylenediamine is disadvantageously used more than necessary, which is unfavorable from the aspect of manufacturing cost.

In the manufacturing method of the present invention, colloidal silica is used as a silica source. As colloidal silica, commercially available colloidal silica can suitably be used, but colloidal silica can be prepared by dissolving fine powder silica in water or by hydrolysis of alkoxide.

A molar ratio (a water/$SiO_2$ molar ratio) between water and $SiO_2$ (silica) included in the raw material solution needs to be in a range of 10 to 500, preferably in a range of 14 to 250, and further preferably in a range of 14 to 112. When the water/$SiO_2$ molar ratio is smaller than this range, a concentration of $SiO_2$ in the raw material solution is excessively high, which is unfavorable in that a large amount of unreacted $SiO_2$ which is not crystallized remains. On the other hand, when the ratio is in excess of this range, the concentration of $SiO_2$ in the raw material solution is excessively low, which is unfavorable in that the DDR type zeolite cannot be formed.

The preparation of the raw material solution has been described above, but an example of an especially preferable mode is a method in which a solution obtained by dissolving 1-adamantaneamine in ethylenediamine, water that is the solvent and colloidal silica are mixed at a predetermined ratio and dissolved, to prepare the raw material solution.

[3] Membrane Formation (Membrane Forming Step)

Figure 7:
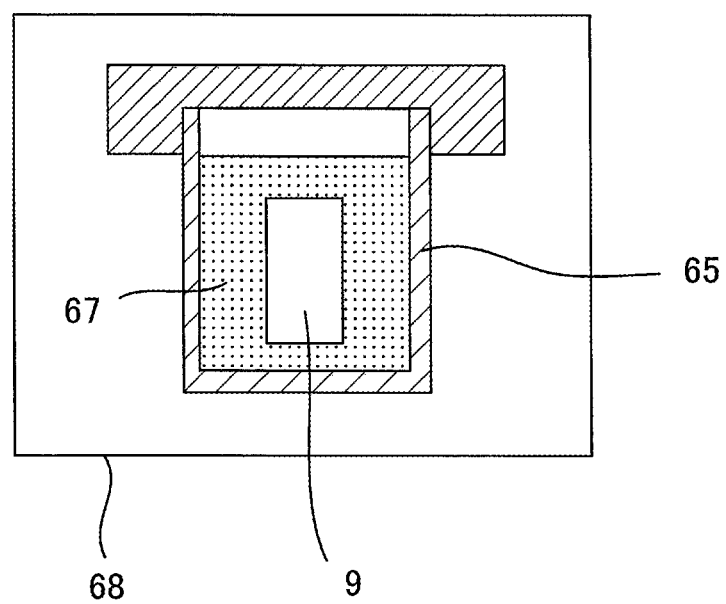
FIG. 7 is a schematic view showing one embodiment of a membrane forming step of forming a zeolite membrane on the honeycomb shaped porous ceramic body by hydrothermal synthesis.

A container (e.g., a wide-mouthed bottle) in which the raw material solution is contained is set to a homogenizer to stir the solution, thereby obtaining a sol 67 for use in hydrothermal synthesis. Next, as shown in FIG. 7, the porous body 9 seeded by the flow-down method is placed in a pressure-resistant container 65, and the prepared sol 67 is further placed. Afterward, this container is placed in a drier 68, and a heating treatment (the hydrothermal synthesis) is performed at 110 to 200° C. for 16 to 120 hours, thereby manufacturing the zeolite membrane.

A temperature (a synthesis temperature) of the heating treatment is preferably in a range of 110 to 200° C., further preferably in a range of 120 to 180° C., and especially preferably in a range of 120 to 170° C. When the temperature of the heating treatment is smaller than this range, the DDR type zeolite unfavorably cannot be formed, and when the temperature is in excess of this range, a DOH type zeolite that is not a desired substance is unfavorably formed.

[4] Washing/Structure Directing Agent Removal

Next, the porous body 9 provided with the zeolite membrane is washed with water or washed in hot water of 80 to 100° C., taken out and dried at 80 to 100° C. Then, the porous body 9 is placed in an electric furnace and heated at 400 to 800° C. in the atmosphere for 1 to 200 hours, thereby burning and removing 1-adamantaneamine in the pores of the zeolite membrane. As described above, it is possible to form the zeolite membrane having less defects and a smaller and more uniform membrane thickness of 10 μm or less than before.

EXAMPLES

Hereinafter, the present invention will be described in more detail on the basis of examples, but the present invention is not limited to these examples.
(Substrate)

20 parts by mass of an inorganic bonding material was added to 100 parts by mass of alumina particles (aggregate particles) having an average particle diameter of 50 μm, and water, a dispersing agent and a thickener were further added, mixed and kneaded to prepare a kneaded material. The obtained kneaded material was extruded to prepare a honeycomb shaped unfired substrate 30.

For the inorganic bonding material, there was used a glass raw material containing $SiO_2$ (80 mol %), $Al_2O_3$ (10 mol %) and alkaline earth (8 mol %) and molten at 1600° C., homogenized, cooled and then ground into an average particle diameter of 1 μm.

In the unfired substrate 30, there were formed discharge through channels 7 each of which passed from one region of an outer peripheral surface 6 through a slit cell 4b to communicate with another region.

Next, a plugging material of a slurry state was charged into a space reaching the discharge through channels 7 from both end faces 2a, 2b of the substrate 30. Then, the substrate 30 was fired. For firing conditions, the firing was performed at 1250° C. for one hour, and each of a temperature raising speed and a temperature lowering speed was set to 100° C./hour. An average pore diameter of the substrate was 20 μm.

(Intermediate Layer)

Next, on inner wall surfaces of cells 4 of the substrate 30, an intermediate layer 31 formed of an alumina porous body having a thickness of 150 μm and an average pore diameter of 0.5 μm was formed. The average pore diameter is a value measured by an air flow method described in ASTM F316.

First, to alumina particles (aggregate particles) having an average particle diameter of 3.5 μm, an inorganic bonding material was added, and water, a dispersing agent and a thickener were further added and mixed to prepare a slurry.

In Examples 1 to 24, 27 and 28, as an inorganic bonding material for preparation of a slurry, a titania bonding material having a titania purity of 99.9 mass % or more and an average particle diameter of 0.7 μm was used as much as 5 to 15 mass % of a solid content (alumina aggregates+the titania bonding material) (see Tables 1 and 2).

In Examples 25 and 26, alumina was used as the inorganic bonding material for the preparation of the slurry.

In Comparative Examples 1 to 14, as the inorganic bonding material for the preparation of the slurry, there was used a glass raw material containing $SiO_2$ (77 mol %), $ZrO_2$ (10 mol %), $Li_2O$ (3.5 mol %), $Na_2O$ (4 mol %), $K_2O$ (4 mol %), CaO (0.7 mol %) and MgO (0.8 mol %) and molten at 1600° C., homogenized, cooled and then ground in an average particle diameter of 0.7 to 5 μm.

Additionally, thermal expansion coefficients of the aggregates and the inorganic bonding material described in Tables 1 and 2 were measured as follows. First, a sample of a prismatic columnar bulk body of 4 mm×3 mm×20 mm was prepared, and the thermal expansion coefficient when a temperature rose from 40° C. to 700° C. was measured. Specifically, a change amount of a length of the sample during the temperature rising was divided by the length of the sample in the longitudinal direction (the length at 40° C.), and further divided by a temperature change (700° C.−40° C.=660° C.) to obtain a value as the thermal expansion coefficient.

The above slurry was adhered to an inner peripheral surface of the substrate 30 by a filtration membrane forming method described in JP-B-S63-66566. Afterward, the firing was performed in an electric furnace under the air atmosphere to form the intermediate layer 31. The firing was performed at each of a temperature raising speed and a temperature lowering speed of 100° C./hour and at a firing temperature described in Tables 1 and 2 for one hour (a keeping time at the firing temperature).

For the porous body 9, an outer shape was columnar, an outer diameter was 30 mm, and a length was 160 mm.
(Formation of Glass Seal)

Next, glass seals 35 were disposed in both the end faces 2a, 2b of the substrate 30 in a state where open ends of the cells 4 were not closed.

(Formation of DDR Type Zeolite Membrane)

A DDR type zeolite membrane was formed as a separation layer 33 (a separation membrane) on the intermediate layer 31.

(1) Preparation of Seed Crystals

On the basis of a method of manufacturing a DDR type zeolite described in M. J. den Exter, J. C. Jansen, H. van Bekkum, Studies in Surface Science and Catalysis vol. 84, Ed. by J. Weitkamp et al., Elsevier (1994) 1159 to 1166, or JP-A-2004-083375, DDR type zeolite crystal powder was manufactured, and this powder was used as it was, or ground as needed for use as seed crystals. The synthesized or ground seed crystals were dispersed in water, and then coarse particles were removed, to prepare a seed crystal dispersion liquid.

(2) Seeding (Particle Adhering Step)

The seed crystal dispersion liquid prepared in (1) was diluted with ion-exchanged water or ethanol and regulated so that a concentration of the DDR type zeolite was from 0.001 to 0.36 mass % (the concentration of a solid content in a slurry 64), and the dispersion liquid was stirred at 300 rpm by a stirrer to obtain a seeding slurry liquid (the slurry 64). The porous body 9 which was porous was anchored to a lower end of a wide-mouthed funnel 62, and 160 ml of a seeding slurry liquid was poured from the upside of the porous body 9 and passed through the cells (see FIG. 6). At this time, the outer peripheral surface 6 of the porous body 9 was masked with Teflon (registered trademark) tape and then seeded. In the porous body 9 in which the slurry 64 was allowed to flow down, the insides of the cells were subjected to forced-air drying at room temperature or 80° C. and at an air speed of 3 to 6 m/s for 10 to 30 minutes. The flow-down of the slurry 64 and the forced-air drying were repeated once to six times to obtain a sample. After the drying, microstructure observation by an electron microscope was carried out. It was confirmed that DDR type zeolite particles were adhered to the surface of the porous body 9.

(3) Membrane Formation (Membrane Forming Step: Hydrothermal Synthesis)

7.35 g of ethylenediamine (manufactured by Wako Pure Chemical Industries, Ltd.) was placed into a 100 ml wide-mouthed bottle made of fluororesin, and then 1.156 g of 1-adamantaneamine (manufactured by Aldrich Co.) was added and dissolved so that no precipitate of 1-adamantaneamine was left. 98.0 g of 30 mass % colloidal silica (Snowtex S manufactured by Nissan Chemical Industries, Ltd.) and 116.55 g of ion-exchanged water were placed into another container and lightly stirred. Afterward, this was added to the wide-mouthed bottle in which ethylenediamine and 1-adamantaneamine were mixed, and strongly shaken to prepare a raw material solution. Molar ratios of the respective components of the raw material solution were 1-adamantaneamine/$SiO_2$=0.016 and water/$SiO_2$=21. Afterward, the wide-mouthed bottle containing the raw material solution was set to a homogenizer, and the solution was stirred for one hour. The porous body 9 to which the DDR type zeolite particles were adhered in (2) was disposed in a stainless steel pressure-resistant container 65 with an inner cylinder having an inner capacity of 300 ml and made of fluororesin, and the prepared raw material solution (a sol 67) was placed, to perform a heating treatment (hydrothermal synthesis) at 140° C. for 50 hours (see FIG. 7). Additionally, during the hydrothermal synthesis, the solution was alkaline by raw materials of colloidal silica and ethylenediamine. When a broken surface of the porous body 9 on which the membrane was formed was observed by a scanning type electron microscope, a membrane thickness of the DDR type zeolite membrane was 10 μm or less.

(4) Structure Directing Agent Removal

The membrane which could be coated was heated by an electric furnace at 450 or 500° C. in the air for 50 hours, to burn and remove 1-adamantaneamine in the pores. By X-ray diffraction, a crystal phase was identified and a DDR type zeolite was confirmed. Furthermore, after the membrane formation, it was confirmed that the porous body 9 was coated with the DDR type zeolite.

As shown in FIG. 5A, a separation membrane structure 1 was placed in a tubular housing 51 having a fluid inlet 52 and a fluid outlet 53, and water was allowed to flow into the housing 51 from the fluid inlet 52 to perform pressurizing by the water. Then, there were checked internal pressure breaking strengths at which the porous body 9 before a DDR type zeolite membrane was formed and the separation membrane structure 1 after the DDR type zeolite membrane was formed (i.e., the porous body 9+the separation layer 33 (the zeolite membrane)) were broken. When the water permeated the structure and the pressure did not rise, an inner surface of each cell 4 was coated with natural latex rubber and dried, to prevent the permeation of the water, thereby measuring the internal pressure breaking strength. Furthermore, for slit cracks, there were observed the vicinity of the discharge through channel 7 in which the slit cracks were easily generated and a cut surface of the vicinity of the center of the porous body 9 in the longitudinal direction which was cut with a vertical surface to the longitudinal direction, with the naked eye or a loupe having a magnification of 10. When a crack extending from the slit cell 4b was present, it was judged that "there was a slit crack". Tables 1 and 2 show the results.

TABLE 1

| | | Intermediate layer | | | | | | | | |
|---|---|---|---|---|---|---|---|---|---|---|
| | Aggregates | Aggregate thermal expansion coefficient $10^{-6}$/K | Bonding material | Bonding material thermal expansion coefficient $10^{-6}$/K | Bonding material average particle diameter μm | Bonding material/ (bonding material + intermediate aggregates) Mass % | Intermediate layer thickness μm | Sintering temp. ° C. | Slit crack | Internal pressure breaking strength MPa |
| Example 1 | Alumina | 7.70 | Titania | 7.82 | 0.7 | 15 | 250 | 1150 | None | 7.3 |
| Example 2 | Alumina | 7.70 | Titania | 7.82 | 0.7 | 15 | 250 | 1150 | None | 7.6 |
| Example 3 | Alumina | 7.70 | Titania | 7.82 | 0.7 | 15 | 250 | 1200 | None | 8.8 |
| Example 4 | Alumina | 7.70 | Titania | 7.82 | 0.7 | 15 | 250 | 1200 | None | 9.7 |
| Example 5 | Alumina | 7.70 | Titania | 7.82 | 0.7 | 15 | 250 | 1250 | None | 14.5 |
| Example 6 | Alumina | 7.70 | Titania | 7.82 | 0.7 | 15 | 250 | 1250 | None | 13.5 |
| Example 7 | Alumina | 7.70 | Titania | 7.82 | 0.7 | 15 | 250 | 1300 | None | 19.8 |
| Example 8 | Alumina | 7.70 | Titania | 7.82 | 0.7 | 15 | 250 | 1300 | None | 19.4 |
| Example 9 | Alumina | 7.70 | Titania | 7.82 | 0.7 | 10 | 250 | 1150 | None | 6.1 |
| Example 10 | Alumina | 7.70 | Titania | 7.82 | 0.7 | 10 | 250 | 1150 | None | 6.4 |
| Example 11 | Alumina | 7.70 | Titania | 7.82 | 0.7 | 10 | 250 | 1200 | None | 9.3 |
| Example 12 | Alumina | 7.70 | Titania | 7.82 | 0.7 | 10 | 250 | 1200 | None | 9.4 |
| Example 13 | Alumina | 7.70 | Titania | 7.82 | 0.7 | 10 | 250 | 1250 | None | 11.2 |
| Example 14 | Alumina | 7.70 | Titania | 7.82 | 0.7 | 10 | 250 | 1250 | None | 13.1 |

TABLE 1-continued

| | | Intermediate layer | | | | | | | |
|---|---|---|---|---|---|---|---|---|---|
| | Aggregates | Aggregate thermal expansion coefficient 10⁻⁶/K | Bonding material | Bonding material thermal expansion coefficient 10⁻⁶/K | Bonding material average particle diameter μm | Bonding material/ (bonding material + intermediate aggregates) Mass % | Intermediate layer thickness μm | Sintering temp. ° C. | Slit crack | Internal pressure breaking strength MPa |
|---|---|---|---|---|---|---|---|---|---|---|
| Example 15 | Alumina | 7.70 | Titania | 7.82 | 0.7 | 10 | 250 | 1300 | None | 17.3 |
| Example 16 | Alumina | 7.70 | Titania | 7.82 | 0.7 | 10 | 250 | 1300 | None | 17.4 |
| Example 17 | Alumina | 7.70 | Titania | 7.82 | 0.7 | 5 | 250 | 1150 | None | 6.5 |
| Example 18 | Alumina | 7.70 | Titania | 7.82 | 0.7 | 5 | 250 | 1150 | None | 6.6 |
| Example 19 | Alumina | 7.70 | Titania | 7.82 | 0.7 | 5 | 250 | 1200 | None | 8.3 |
| Example 20 | Alumina | 7.70 | Titania | 7.82 | 0.7 | 5 | 250 | 1200 | None | 8.5 |
| Example 21 | Alumina | 7.70 | Titania | 7.82 | 0.7 | 5 | 250 | 1250 | None | 10.3 |
| Example 22 | Alumina | 7.70 | Titania | 7.82 | 0.7 | 5 | 250 | 1250 | None | 9.7 |
| Example 23 | Alumina | 7.70 | Titania | 7.82 | 0.7 | 5 | 250 | 1300 | None | 16.6 |
| Example 24 | Alumina | 7.70 | Titania | 7.82 | 0.7 | 5 | 250 | 1300 | None | 16.8 |

TABLE 2

| | | Intermediate layer | | | | | | | |
|---|---|---|---|---|---|---|---|---|---|
| | Aggregates | Aggregate thermal expansion coefficient 10⁻⁶/K | Bonding material | Bonding material thermal expansion coefficient 10⁻⁶/K | Bonding material average particle diameter μm | Bonding material/ (bonding material + intermediate aggregates) Mass % | Intermediate layer thickness μm | Sintering temp. ° C. | Slit crack | Internal pressure breaking strength MPa |
|---|---|---|---|---|---|---|---|---|---|---|
| Comparative Example 1 | Alumina | 7.70 | Glass | 4.55 | 2 | 12 | 250 | 1250 | Present | 19.1 |
| Comparative Example 2 | Alumina | 7.70 | Glass | 4.55 | 2 | 12 | 250 | 1250 | Present | 15.3 |
| Comparative Example 3 | Alumina | 7.70 | Glass | 4.55 | 2 | 12 | 250 | 1300 | Present | |
| Comparative Example 4 | Alumina | 7.70 | Glass | 4.55 | 2 | 12 | 250 | 1300 | Present | |
| Comparative Example 5 | Alumina | 7.70 | Glass | 4.55 | 2 | 8 | 250 | 1250 | Present | 17.0 |
| Comparative Example 6 | Alumina | 7.70 | Glass | 4.55 | 2 | 8 | 250 | 1250 | Present | 15.8 |
| Comparative Example 7 | Alumina | 7.70 | Glass | 4.55 | 2 | 8 | 250 | 1300 | Present | 19.9 |
| Comparative Example 8 | Alumina | 7.70 | Glass | 4.55 | 2 | 8 | 250 | 1300 | Present | 19.3 |
| Comparative Example 9 | Alumina | 7.70 | Glass | 4.55 | 5 | 12 | 250 | 1250 | Present | 15.5 |
| Comparative Example 10 | Alumina | 7.70 | Glass | 4.55 | 5 | 12 | 250 | 1250 | Present | 15.9 |
| Comparative Example 11 | Alumina | 7.70 | Glass | 4.55 | 5 | 12 | 250 | 1300 | Present | 18.9 |
| Comparative Example 12 | Alumina | 7.70 | Glass | 4.55 | 5 | 12 | 250 | 1300 | Present | 20.0 |
| Comparative Example 13 | Alumina | 7.70 | Glass | 4.55 | 0.7 | 12 | 250 | 1300 | Present | |
| Comparative Example 14 | Alumina | 7.70 | Glass | 4.55 | 0.7 | 12 | 250 | 1300 | Present | |
| Example 25 | Alumina | 7.70 | Alumina | 7.70 | 0.3 | 14 | 150 | 1250 | None | 15.5 |
| Example 26 | Alumina | 7.70 | Alumina | 7.70 | 0.3 | 14 | 250 | 1250 | None | 15.0 |
| Example 27 | Alumina | 7.70 | Titania | 7.82 | 0.4 | 15 | 150 | 1250 | None | 13.6 |
| Example 28 | Alumina | 7.70 | Titania | 7.82 | 0.4 | 15 | 250 | 1250 | None | 15.3 |

In Comparative Examples 1 to 14 in which the inorganic bonding material of the intermediate layer 31 was glass, the slit cracks were generated. In Comparative Examples 13 and 14, the average particle diameter of the inorganic bonding material was small to the same extent as in the examples, but the thermal expansion coefficient was smaller than the thermal expansion coefficient of the aggregates, so that the slit cracks were generated. On the other hand, in Examples 1 to 28, any slit cracks were not generated. The firing temperature was preferably 1250° C. or more. Furthermore, the content ratio of the bonding material was preferably 10 mass % or more and especially preferably 15 mass %. The firing temperature and the content ratio of the bonding material were in these ranges, and hence the internal pressure breaking strength was improved.

INDUSTRIAL APPLICABILITY

A porous body and a separation membrane structure of the present invention can suitably be utilized as means for separating part of components from a mixed fluid.

DESCRIPTION OF REFERENCE NUMERALS

1: (honeycomb shaped ceramic) separation membrane structure, 2, 2a and 2b: end face, 3: partition wall, 4: cell, 4a: separation cell, 4b: slit cell, 6: outer peripheral surface, 7: discharge through channel, 8: plugging portion, 9: (honeycomb shaped ceramic) porous body, 30: substrate, 31: intermediate layer, 31a: first intermediate layer, 31b: second intermediate layer, 32: top layer, 33: separation layer (separation membrane), 35: glass seal, 40: substrate thickness, 41: intermediate layer and top layer thickness, 42: cell diameter, 51: housing, 52: fluid inlet, 53 and 58: fluid outlet, 54: sealing material, 62: wide-mouthed funnel, 63: cock, 64: slurry, 65: pressure-resistant container, 67: sol, and 68: drier.

The invention claimed is:

1. A honeycomb shaped porous ceramic body comprising:
a honeycomb shaped substrate which has partition walls made of a porous ceramic material comprising aggregates and in which there are formed a plurality of cells to become through channels of a fluid passing through the porous ceramic body by the partition walls;
separation cells wherein an intermediate layer made of a porous ceramic material and having a smaller average pore diameter as compared with the average pore diameter of the pores at the surface of the substrate, and disposed at the surface of the substrate, and a separation layer disposed as an outermost layer of the separation cells; and
slit cells in which the intermediate layer is not disposed,
wherein the intermediate layer has a structure where aggregate particles are bonded to one another by an inorganic bonding material having a thermal expansion coefficient equal to or higher than that of the aggregate particles,
wherein the aggregates constituting the substrate and the aggregate particles of the intermediate layer are alumina, and the inorganic bonding material which bonds the aggregates of the intermediate layer is titania, and
wherein the honeycomb shaped porous ceramic body has an internal pressure breaking strength of 8 MPa or more.

2. The honeycomb shaped porous ceramic body according to claim 1,
wherein a content ratio of the inorganic bonding material to the total inorganic solid content of the intermediate layer is from 5 to 15 mass %.

3. The honeycomb shaped porous ceramic body according to claim 1,
wherein on the intermediate layer, a top layer made of a porous ceramic material having finer particles than the intermediate layer is disposed.

4. The honeycomb shaped porous ceramic body according to claim 3, wherein the top layer includes alumina as a main component.

5. A honeycomb shaped porous ceramic body comprising:
a honeycomb shaped substrate which has partition walls made of a porous ceramic material comprising aggregates and in which there are formed a plurality of cells to become through channels of a fluid passing through the porous ceramic body by the partition walls;
separation cells wherein an intermediate layer made of a porous ceramic material and having a smaller average pore diameter as compared with the average pore diameter of the pores at the surface of the substrate, and disposed at the surface of the substrate, and a separation layer disposed as an outermost layer of the separation cells; and
slit cells in which the intermediate layer is not disposed,
wherein the intermediate layer is formed by adhering a slurry, which includes aggregate particles and an inorganic bonding material having a thermal expansion coefficient equal to or higher than that of the aggregate particles, to the substrate and then firing at 1200 to 1300° C.,
wherein the intermediate layer has a structure where the aggregate particles are bonded to one another by the inorganic bonding material,
wherein the aggregates constituting the substrate and the aggregate particles of the intermediate layer are alumina, and the inorganic bonding material which bonds the aggregates of the intermediate layer is titania, and
wherein the honeycomb shaped porous ceramic body has an internal pressure breaking strength of 8 MPa or more.

* * * * *